United States Patent [19]

Braunheim

[11] Patent Number: 5,689,389
[45] Date of Patent: Nov. 18, 1997

[54] LOW PROFILE SWAGE MOUNT

[75] Inventor: Stephen T. Braunheim, Santa Barbara, Calif.

[73] Assignee: Intri-Plex Technologies, Inc., Santa Barbara, Calif.

[21] Appl. No.: 589,863

[22] Filed: Jan. 22, 1996

[51] Int. Cl.$^6$ ............................. G11B 5/48; G11B 21/16
[52] U.S. Cl. ............................................................. 360/104
[58] Field of Search .................................. 360/103–106, 360/97.01

[56] References Cited

U.S. PATENT DOCUMENTS

| | | | |
|---|---|---|---|
| 3,702,461 | 11/1972 | Cantwell | 360/104 |
| 3,713,121 | 1/1973 | Fasano et al. | 360/104 |
| 3,723,980 | 3/1973 | Gabor | 360/106 |
| 3,786,457 | 1/1974 | Kahn | 360/104 |
| 3,864,750 | 2/1975 | Applequist | 360/105 |
| 3,931,641 | 1/1976 | Watrous | 360/104 |
| 3,984,872 | 10/1976 | Beecroft | 360/103 |
| 4,019,205 | 4/1977 | Salmond et al. | 360/105 |
| 4,107,748 | 8/1978 | Ho | 360/104 |
| 4,167,765 | 9/1979 | Watrous | 360/103 |
| 4,286,297 | 8/1981 | Root et al. | 360/103 |
| 4,347,535 | 8/1982 | Dalziel | 360/104 |
| 4,379,315 | 4/1983 | Schuler | 360/105 |
| 4,391,035 | 7/1983 | Van de Bult | 29/603 |
| 4,399,476 | 8/1983 | King | 360/104 |
| 4,408,238 | 10/1983 | Hearn | 360/104 |
| 4,713,706 | 12/1987 | Oosaka et al. | 360/104 |
| 4,731,920 | 3/1988 | Nishijima et al. | 29/603 |
| 4,783,710 | 11/1988 | Salyer et al. | 360/104 |
| 4,807,054 | 2/1989 | Sorensen et al. | 360/104 |
| 4,819,094 | 4/1989 | Oberg | 360/104 |
| 4,829,395 | 5/1989 | Coon et al. | 360/104 |
| 4,893,205 | 1/1990 | Hoppe et al. | 360/104 |
| 4,912,583 | 3/1990 | Hinlein | 360/104 |
| 5,003,420 | 3/1991 | Hinlein | 360/104 |
| 5,140,481 | 8/1992 | Cain et al. | 360/104 |
| 5,153,794 | 10/1992 | Hinlein | 360/104 |
| 5,172,286 | 12/1992 | Jurgenson | 360/104 |
| 5,185,683 | 2/1993 | Oberg et al. | 360/104 |
| 5,262,911 | 11/1993 | Cain et al. | 360/104 |
| 5,299,081 | 3/1994 | Hatch et al. | 360/104 |
| 5,390,058 | 2/1995 | Yamaguchi | 360/104 |
| 5,461,524 | 10/1995 | Jurgenson | 360/104 |
| 5,471,734 | 12/1995 | Hatch et al. | 29/603 |
| 5,497,282 | 3/1996 | Hoffmann et al. | 360/104 |
| 5,508,860 | 4/1996 | Takagi et al. | 360/97.01 |
| 5,543,982 | 8/1996 | Takagi et al. | 360/97.01 |

OTHER PUBLICATIONS

Intri–Plex Drawing Part No. 1503–02 Mar. 1990.

*Primary Examiner*—Jefferson Evans
*Attorney, Agent, or Firm*—Fulwider Patton Lee & Utecht, LLP

[57] ABSTRACT

A low profile swage mount for connecting a disc drive actuator arm to the load beam of a head suspension assembly and including a base plate formed on one side with an opening and having a hollow hub disposed on the opposite side. The hub is formed with an inner swaging surface having a diameter approximating the diameter of the base plate opening to give the swage mount torqe retention characteristics comparable to conventional swage mounts much larger in size.

9 Claims, 3 Drawing Sheets

FIG. 1
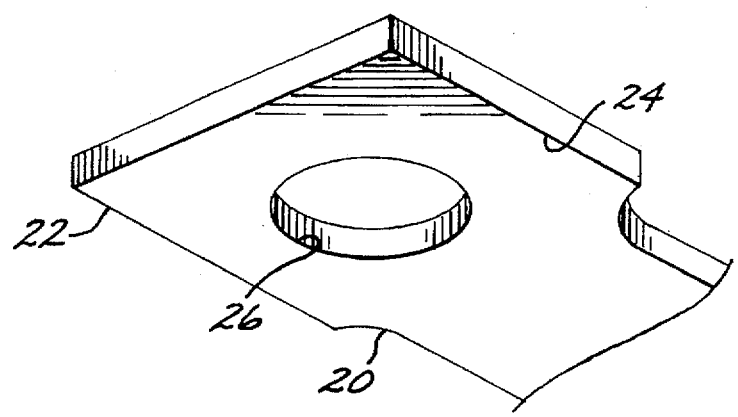
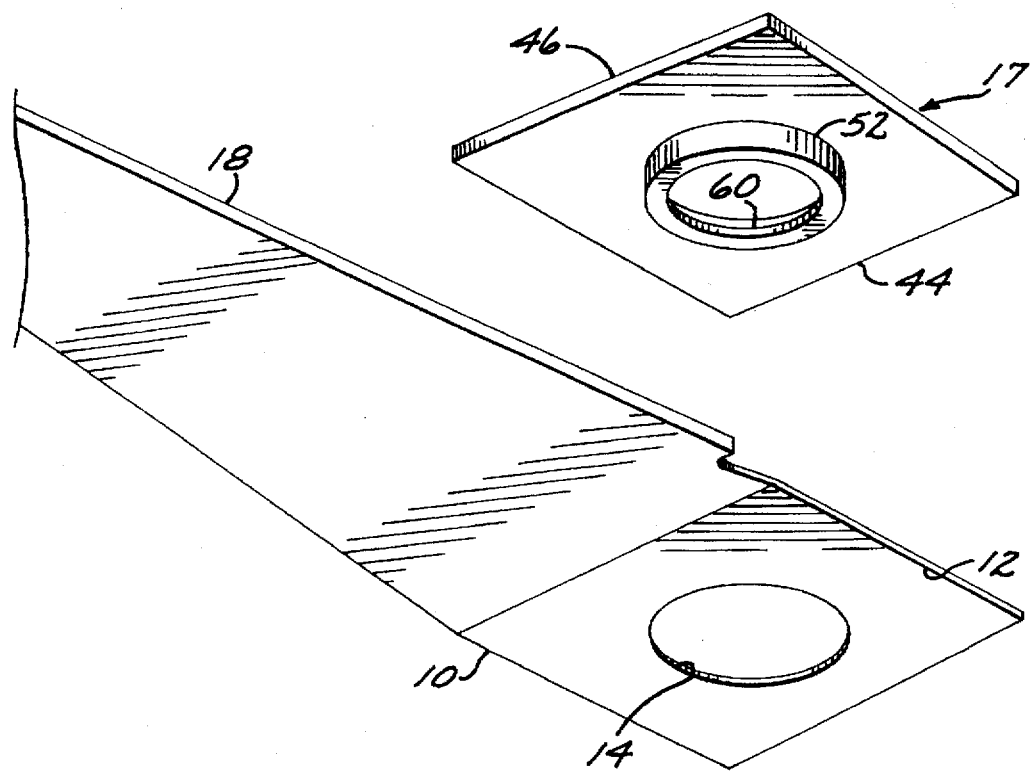

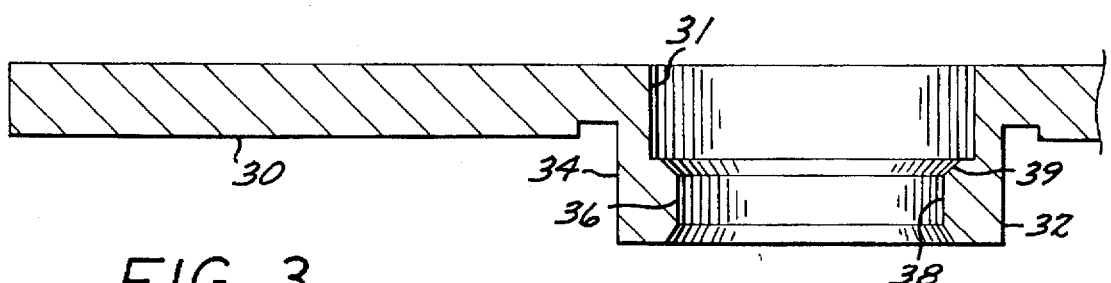
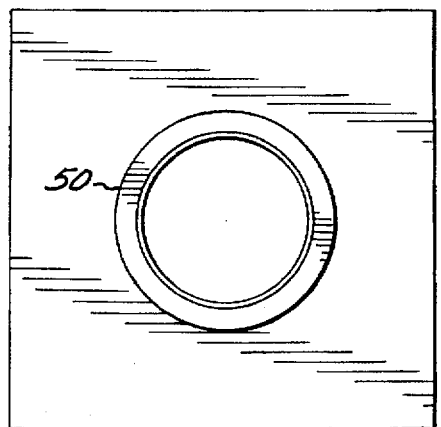
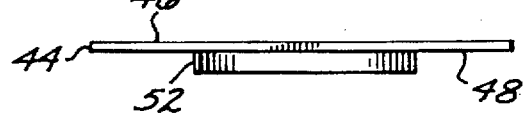
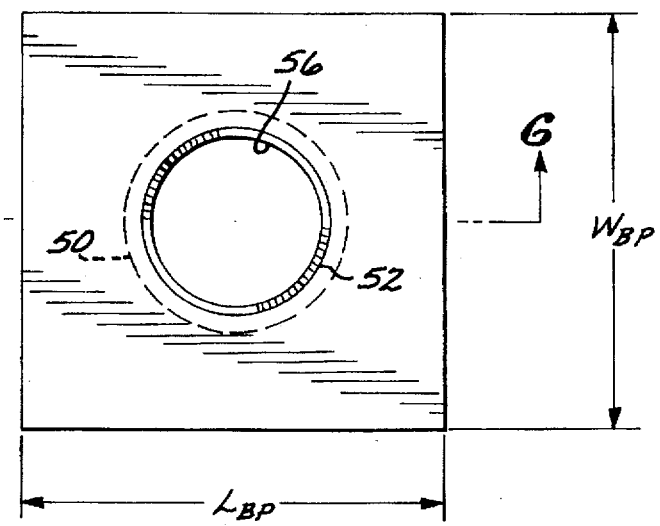

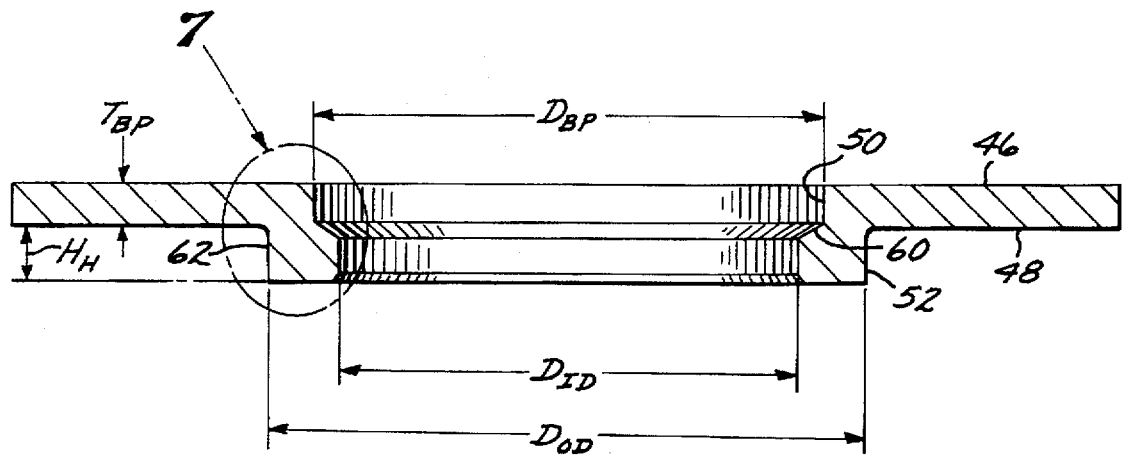
FIG. 6
FIG. 7
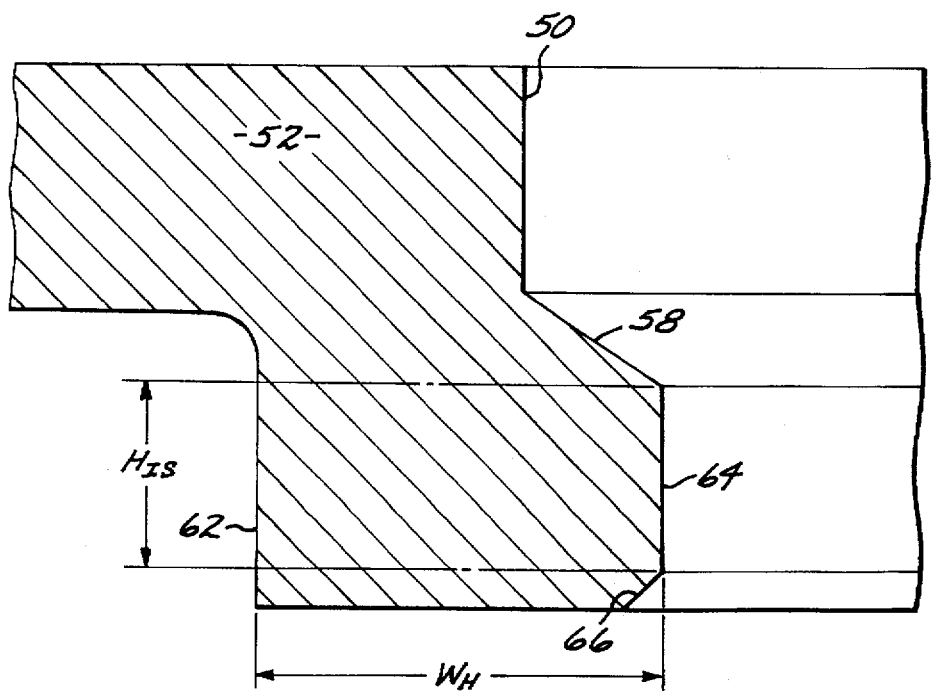

LOW PROFILE SWAGE MOUNT

BACKROUND OF THE INVENTION

1. Field of the Invention

The present invention relates to disc drive components and more particularly a low profile swage mount fastener for securing a load beam of a magnetic head suspension assembly to an actuator arm.

2. Description of the Prior Art

Rotating memories, or disc drives as they are more commonly called, combine electronics and mechanical means to establish data paths for information storage and retrieval. Such devices may be found in computers, facsimile machines, copiers, or any other system where mass data storage and retrieval is desired. Two of the more important and costly sub assemblies in such drives include a head suspension assembly, or HSA, and a controller driven actuator assembly. The two assemblies function as a unit to precisely position a read/write head vertically adjacent a precise point on a disc drive platter, with the actuator directing the movement of the HSA across the face of the platter through control of an actuator arm connected to the HSA. Each sub-assembly includes precision made components manufactured to exacting standards which consequently increases the cost of such parts. Because of the complexity and cost involved in each sub assembly, manufacturers have found that having the ability to disconnect and reconnect the two systems substantially reduces costs should one or the other need rework or become irreparably damaged and require replacement.

To realize the ability of repairing and/or replacing key components cost effectively, the HSA and actuator assemblies are typically connected at a stacked vertical joint defined by the distal end of a pivoting actuator arm, and the proximal end of a thin elongated load beam. The opposite end of the load beam supports a read/write head which sweeps across the disc platter in response to the actuator controller. Satisfactory operation of the drive requires the read/write head to be selectively positioned vertically adjacent to selected microscopically compressed annular data tracks formed on the platter within response times on the order of ten milliseconds. Such response involves acceleration levels on the sweeping load beam up to 40 Gs. Therefore, the fastener connecting the actuator arm to the load beam must have the capability to withstand considerable torque on the order of 10 inch-ounces.

Disc drive manufacturers continually endeavor to reduce the size of their drives because of market pressures demanding better performance from smaller systems. Better performance not only includes the speed of operation, but the overall data storage capability of the drive, often expressed in terms of memory density. To increase the memory density, additional double sided platters are often vertically stacked with respective actuator assemblies and HSAs. However, incorporating additional platters into the drive often increases the vertical profile of the drive. Therefore, those skilled in the art have recognized that in order to further increase stacking density and lower the vertical profile of such drives, either existing components must be miniaturized and/or assembly methods must be changed.

One proposal for fastening actuator arms to load beams in light of the above considerations is disclosed in U.S. Pat. No. 4,912,583 to Hinlein. The patent discloses a threaded clamp having a thin nut plate formed with a threaded boss and a screw for threadable engagement with such boss. The boss is formed to telescopically engage respective openings formed in the actuator arm and load beam with the screw then confining the components therebetween. The actuator arm and load beam are then clamped in vertical relationship such that the load beam and actuator arm act as a single unit. While this type of fastener is satisfactory for its intended purpose, because of the multiple plate and screw arrangement, the overall vertical profile is relatively high.

An alternative to the solution proposed above is disclosed in U.S. Pat. No. 4,829,395 to Coon, and allegedly improved upon in U.S. Pat. No. 5,172,286 to Jurgenson. These patents teach a fastener for connecting the actuator arm to the load beam through use of a swaging process. The fastener, or swage mount, comprises a thin base plate formed on one side with an opening and formed on the other side with an outwardly projecting cylindrical boss of a predetermined height and radius corresponding to the opening formed in the load beam. The boss includes an inner engagement surface axially aligned with the base plate opening for receiving a staking element therethrough during the swaging process. Fastening is accomplished by first welding the swage mount base plate to the actuator arm, then positioning the load beam opening telescopically over the swage mount boss. An oversized swaging element is then staked through the openings to radially expand the swage mount boss to connect the components through an interference fit. The primary advantage of the swage mount fastener is the omission of the screw, which undesirably increases the vertical profile of the actuator arm to load beam joint. Disconnection of the components is easily accomplished by simply breaking the bond through application of a force exceeding the torque retention of the swage mount. The asserted improvement in Jurgenson further expands on the principles of the swage mount disclosed by Coon by constructing two low profile swage mounts having complementarily formed hubs that, when swaged together, are said to provide sufficient torque retention to fasten the load beam to the actuator arm.

While the conventional swage mount configurations disclosed in Coon and Jurgenson allow a substantial reduction in overall vertical profile for the actuator arm/load beam connection, those skilled in the art have recognized that such swage mounts of conventional construction are subject to minimum profile limits in order to maintain sufficient torque retention. This is amply illustrated in Jurgenson where two low profile fasteners were required in order to form a hub allegedly capable of providing the torque retention needed to maintain the connection with the load beam. The conventional thought is based primarily on the assumption that the torque retention obtainable is primarily dependent upon the hub height and hub radial thickness. Following this conventional wisdom, a hub mass having a greater outer cylindrical surface area and stiffness creates a better torque retaining interference fit when outwardly deformed. It is believed that for conventional swage mounts, the greater the differential between the base plate opening diameter and the hub inner engagement surface diameter, the greater the torque retention because of the increased mass displaced outwardly during the swaging process. However, conventional thought also follows the notion that practically, the hub can be no thicker than the base plate thickness. Thus, as the base plate profile is lowered, the torque retention capability in conventional swage mounts is correspondingly lower, with a minimal limit that prevents operability of the fastener.

What has been needed, and heretofore unavailable, is a single swage mount apparatus having a profile substantially lower than conventional swage mounts, but having torque retaining characteristics equivalent to such conventional swage mounts. The apparatus of the present invention satisfies this need.

SUMMARY OF THE INVENTION

The method and apparatus of the present invention is directed to a single low profile swage mount that significantly lowers the vertical profile of the disc drive actuator arm to load beam connection while maintaining torque retention characteristics comparable to larger conventional swage mounts. More particularly, the present invention is directed to a low profile disc drive fastener having torque retaining characteristics previously obtainable with larger conventional fasteners. Current fasteners, or swage mount configurations include a base plate of a predetermined thickness and formed on one side with an opening. The other side is formed with an outwardly projecting cylindrical boss of a predetermined height and radial thickness corresponding to the base plate thickness and the openings formed in the actuator arm and load beam. The boss includes an inner engagement surface of a diameter substantially smaller than the baseplate opening diameter and axially aligned with the base plate opening for receiving a staking element therethrough during the swaging process. Such process creates an interference fit between the actuator arm, the load beam, and the swage mount. Low profile variations of such a swage mount are known in the art but require at least two such fasteners to create a hub capable of providing adequate torque retention. Due to assumptions requiring the baseplate opening and hub inner engagement diameters to be substantially different, and the relationship between the hub wall radial thickness to the baseplate thickness, the magnitude of the torque retention obtainable in conventional swage mounts is severely compromised with reductions in base plate thickness.

The method and apparatus of the present invention solves this problem by going against conventional wisdom and forming such diameters substantially similar in relative dimension. The fastener includes a base having a planar mounting surface and formed with a hole having a first diameter. The fastener is further formed with a boss formed into a ring shaped annular hub slightly smaller than the respective swage openings and raised outwardly from the base and formed centrally with an aperture in communication with the hole to form a swaging channel and defining an inner element engaging surface of a second diameter. The second diameter is at least 85% of the size of the first diameter, but not greater than the first diameter. The diameters are sufficient to, after a swaging element is staked through the opening and the aperture, cause the hub to deform radially outwardly to engage the swage opening and exert a frictional force of a magnitude sufficient to form a torque retaining interference fit.

Other features and advantages of the present invention will become apparent from the following detailed description thereof and the accompanying exemplary drawings.

BRIEF DESCRIPTION OF THE DRAWINGS

FIG. 1 is an exploded partial perspective view of an actuator arm and load beam which are connected by the swage mount of the present invention;

FIG. 2 is an enlarged partial horizontal sectional view of a conventional swage mount;

FIG. 3 is an enlarged top plan view of the swage mount of the present invention shown in FIG. 1;

FIG. 4 is a side elevational view of the swage mount shown in FIG. 3;

FIG. 5 is a bottom view of the swage mount shown in FIG. 3;

FIG. 6 is an enlarged vertical sectional view of the swage mount of the present invention taken in enlarged scale along line 6—6 of FIG. 5; and FIG. 7 is a further enlarged view of the horizontal sectional view of the hub within the area designated 7 in FIG. 6.

DETAILED DESCRIPTION OF A PREFERRED EMBODIMENT

A preferred embodiment of the swage mount of the present invention, shown in FIG. 1, and 3–7, is constructed to provide a very low vertical profile while retaining adequate torque retention characteristics to fasten a disc drive actuator arm to a load beam. The load beam and actuator arm are key components of two complex sub-assemblies that occasionally require rework or repair. To avoid costly replacement of both sub-assemblies should only one be defective, manufacturers have employed fasteners known as swage mounts for the detachable connection of the load beam to the actuator arm. However, like all disc drive components, such swage mounts contribute to the overall vertical profile of the drive. Therefore, it is desirable to have swage mounts constructed with very low profiles and yet retain adequate torque retention necessary to connect the load beam and actuator arm together.

Referring to FIG. 1, a conventional disc drive load beam 10 includes an elongated thin strip of metal having a rectangularly formed proximal end that extends and tapers inwardly to a head suspending distal end. The proximal end includes a planar attachment face 12 and a centrally formed swage opening 14 for telescopically receiving the hub of a swage mount embodying the present invention, generally designated 17. The load beam is formed on its respective longitudinal sides with respective upturned rails 18 that extend intermediate the length thereof. The rails typically must be symmetrically formed on the load beam due to resonances that develop from unbalanced components during operation of the drive.

With continued reference to FIG. 1, a conventional disc drive actuator arm 20 is formed with a relatively thick metallic base 22, and includes at its distal end a planar mounting surface 24. The arm is formed centrally therethrough with a swage opening 26 for allowing passage of a swaging element during assembly of the disc drive. The arm 20 is typically mounted at its proximal end (not shown) to a conventional actuator controller (not shown) that sweeps the arm through a predetermined angular path along a horizontal plane.

Referring to FIG. 2, conventional prior art swage mount fasteners that currently connect disc drive actuator arms to load beams typically include a horizontal flat metallic base plate 30 formed with a substantially cylindrical opening 31. The opposite side of the base plate is formed with a hub 32 depending a predetermined height from the underside of the base plate. The hub 32 defines an outer engagement surface 34, and an inner swaging surface 36. Opening 38 formed in hub 32 extends upwardly to and merges into the base plate opening 31 through an intermediate necked down lead-in shoulder 39.

In order to provide sufficient torque retention, conventional swage mount hubs are typically formed such that the difference between the hub opening 38 and the base plate opening 31 is relatively large. Generally, as the conventional swage mount dimensions are decreased, the conventional hub opening diameter typically cannot be formed any closer than about 85% of the base plate opening diameter without loss of functionality of the swage mount. Additionally, the height of the inner swaging surface is typically less than 70% of the hub predetermined height due to the conventional desirability of positioning as much mass at the end of the hub as possible. Because of marketing pressures to minimize the vertical profile of conventional disc drives, it is desirable to construct low profile swage mounts substantially smaller than currently available conventional swage mounts. However, simply reducing the overall dimensions of conventional swage mounts critically affects the fastening functionality thereof. As a result, current conventional swage mounts are close to reaching the minimal profile threshold.

As illustrated in FIGS. 3–7, the swage mount 17 of the present invention solves the lower limit profile problem by employing relationships nowhere used in the art to give adequate torque retention characteristics to swage mount fasteners substantially lower in profile than conventional swage mounts.

Referring to FIG. 3, a preferred embodiment of the low profile swage mount 17, includes a thin, substantially rectangular horizontal base plate 44 typically constructed from 300 series stainless steel and having oppositely disposed first and second planar surfaces 46 and 48 for contacting the respective planar contact surfaces 12 and 24 of the actuator arm 20 and the load beam 10 of FIG. 1. In a preferred embodiment, the thickness of the base plate is on the order of 0.20 millimeters, but may be reduced further in accordance with the present invention. Likewise, the base plate may take on varying peripheral polygonal shapes depending on the disc drive manufacturer and the configuration of the load beam and actuator arms used in the disc drive.

With continued reference to FIG. 3 and also to FIG. 7, the base plate 44 is formed on the first planar surface 46 with an opening 50 having a first diameter $D_{BP}$ and extending through the base plate for initial receipt of a swaging element (not shown) during a swaging process hereindescribed below. The opening 50 is preferably cylindrical with the first diameter being on the order of 2.3 millimeters to allow sufficient clearance for a conventional swaging element (not shown) to pass through freely without deforming the material defining the opening 50.

Referring to FIGS. 4–7, the swage mount 17 includes a hollow cylindrical hub 52 formed on the second planar surface 48 of the base plate 44 and disposed opposite the base plate opening 50. The hub 52 depends from the underside of the base plate a predetermined perpendicular height $H_H$ and is adapted to closely fit within either of the swage openings 14 or 26 of the load beam 10 or actuator arm 20. An aperture 56 is formed centrally through the hub 52 and coaxially aligned with the base plate opening 50 to be merged therewith by an intermediately formed lead-in shoulder 58 to form a swaging channel 60. The hub has a radial width $W_H$ defined by the respective outer and inner diameters $D_{ID}$ and $D_{OD}$ of an outer engagement surface 62 that telescopically fits within either swage opening 14 or 26, and an inner swaging surface 64. The outer engagement surface 62 is configured to nest within the load beam or actuator arm swage openings 14 or 26 and forms an interference fit with the load beam or actuator arm during the swaging process. The inner swaging surface 64 is formed to extend axially from the distal edge of the shoulder 58 a selected depth $H_{IS}$ and is adapted to engage a swaging element (not shown) during the swaging process. In a preferred embodiment, the distal interior edge of the hub is formed with a tapered marginal chamfer at 66 to provide space for the displacement of material during the swaging operation.

It has been found by applicant that by adhering to particular dimensional relationships between the aforedescribed features, the swage mount 17 of the present invention may be reduced in size to exhibit a vertical profile nowhere anticipated in the art while maintaining torque retention of magnitudes comparable to much larger swage mount profiles.

A particular and unexpected relationship deemed critical to the successful operation of the swage mount of the present invention involves the relative diameters of the base plate opening $D_{BP}$, and the hub inner swaging surface $D_{ID}$. It has been found by applicant that if $D_{ID}$ is at least 85% of the diameter of $D_{BP}$, but no greater than $D_{BP}$, then the swage mount vertical profile may be dramatically reduced by at least a factor of three while still maintaining adequate torque retention. In comparison, conventional swage mounts typically have a relationship whereby $D_{ID}$ is no greater than 84% of $D_{BP}$.

Although not as critical to the functionality of the swage mount as the relative diameters $D_{BP}$ and $D_{ID}$, the relationship between the inner swage surface depth $H_{IS}$ and the hub height $H_H$ adds even more torque retention to the swage mount of the present invention than the sole incorporation of the critical dimensional relationship above. Determinations by applicant have indicated that an increase in torque retention is realized by constructing $H_{IS}$ to be at least 70% of the height of $H_H$. This gives the hub interior an area of "land" for engaging the swaging element that is much larger than conventional swage mounts, which are typically formed with an $H_{IS}$ being only about 50–65% of $H_H$.

Approximate dimensions of a preferred embodiment of the swage mount of the present invention are given in Table 1 below:

TABLE 1

| SYMBOL | NAME | DIMENSION (MM) |
|---|---|---|
| $L_{BP}$ | Base Plate Length | 5.080 |
| $W_{BP}$ | Base Plate Width | 5.080 |
| $T_{BP}$ | Base Plate Thickness | 0.203 |
| $D_{BP}$ | Base Plate Opening Diameter | 2.312 |
| $D_{ID}$ | Hub Inner Diameter | 2.083 |
| $D_{OD}$ | Hub Outer Diameter | 2.731 |
| $H_H$ | Hub Overall Height | 0.145 |
| $H_{IS}$ | Hub Inner Surface Depth | 0.094 |
| $W_H$ | Hub Radial Width | 0.648 |

As noted above, the swage mount 17 of the present invention functions to fasten an HSA load beam 10 to an actuator arm 20 of a conventional actuator assembly. Referring to FIG. 1, the first planar surface 46 of the base plate 44 is typically welded to the actuator arm such that the hub 52 projects outwardly from the actuator arm and the swaging channel 60 aligns axially with the swage opening 26. The proximal end of the load beam, with the swage opening 14 formed therethrough, is then brought into longitudinal alignment with the actuator arm 20 and the swage opening 14 closely fitted around the hub 52 such that the load beam 10, the actuator arm 20 and the swage mount 17 form a vertically stacked joint. Once the proper alignment is obtained, a conventional swaging element (not shown) is selected to connect the load beam to the swage mount hub 52 through the formation of an interference fit.

The interference fit bonding the load beam to the swage mount is a result of the hub being deformed radially outwardly to frictionally engage the close fitting wall of the load beam swage opening 14. Typically, the swaging element is a spherical ball having a diameter slightly smaller than the base plate opening diameter $D_{BP}$. The ball is forcefully inserted through the swaging channel 60 until it engages the shoulder 58 which acts as a lead-in to the rest of the hub inner swaging surface 64. Continued forceful application of the ball through the channel collapses the shoulder thereby beginning a radially outwardly displacement of the hub. This displacement causes the hub outer engagement surface 62 to exert a radially compressive frictional force against the wall of the load beam swage opening 14, thereby forming the interference fit.

While the preliminary steps above have been described in terms of welding the swage mount 17 to the actuator arm 20, then swaging the hub 52 to the load beam 10, it is to be anticipated that the swage mount could equally be effective if first mounted to the load beam, with the hub engaging the swage opening 26 of the actuator arm for application of the interference fit. In such configurations, the swage mount is typically interposed between the load beam and actuator arm. However, the swage mount of the present invention may be positioned at the upper or lower extremity of the stacked joint. In such a configuration, the hub would merely be fitted into both swaging openings 14 and 26 without the necessity of welding the swage mount to either component. The hub would then be swaged to form an interference fit with both the load beam and the actuator arm.

Important advantages result from constructing the swage mount 17 with the aforedescribed relationships between $D_{BP}$ and $D_{ID}$, and between $H_H$ and $H_{IS}$. Conventional wisdom in the field follows the assumptions that the torque retention obtainable is primarily dependent upon the hub height that, with the hub radial thickness, defines the hub mass. Following this conventional wisdom, a hub mass having a greater outer cylindrical surface area and stiffness supposedly creates a better torque retaining interference fit when outwardly deformed. This wisdom arises from the belief that the greater the differential between $D_{BP}$ and $D_{ID}$, the greater the torque retention because of the increased mass displaced outwardly during the swaging process. Another conventional assumption is that practically, the hub can be no thicker than the base plate thickness. Thus, as the base plate profile is lowered, the torque retention capability in conventional swage mounts must correspondingly lower, with a minimal limit that prevents operability of the fastener. However, in constructing a swage mount in accordance with the present invention, by maintaining the aforedescribed relationships between $D_{BP}$ and $D_{ID}$, and $H_H$ to $H_{IS}$, the profile of the swage mount 17 may be greatly reduced while still maintaining sufficient torque retention for fastening the actuator arm to the load beam.

In an alternative embodiment, the swage mount of the present invention is heat treated according to a method disclosed in applicant's U.S. Pat. No. 5,591,277, issued Jan. 7, 1997, herein incorporated by reference. Generally, the method involves an annealing process utilizing a closed environment evacuated to a subatmospheric pressure and thermally conditioning the swage mounts by controlled heating and cooling. The swage mounts are first exposed to an elevated predetermined temperature within the environment and subsequently cooled controllably using a thermal control mechanism. Such cooling is carded out until a predetermined lower temperature threshold is reached, at which time the swage mount is quickly quenched in a cryogenic medium. Following quench, the component is returned to an ambient environment. The resulting grain structure of the material significantly enhances the coefficient of friction of the component thus enabling hub vertical profiles to be dramatically decreased while still retaining adequate fastening functionality.

It will be appreciated by those skilled in the art that the swage mount of the present invention provides a low vertical profile previously unobtainable by conventional swage mounts, yet maintains adequate torque retention to connect HSA load beams to actuator arms. Such profile reduction enables disc drive component manufacturers to correspondingly reduce load beam and actuator arm profiles to contribute in the overall profile reduction of the disc drive. Additional disc platters may then be installed without increasing the drive's overall size.

Those skilled in the art will also appreciate that the present invention enables lower stacking heights without any costly changes in disc drive manufacturing assembly methods. Because the ball staking swaging process is currently accepted as the preferable method of connecting actuator arms to disc drives, the only anticipated changes required to the established method is the reduction in ball size due to potential reductions in opening diameters.

While particular forms of the invention have been illustrated and described, it will be apparent to those familiar with the art that various modifications and improvements can be made without departing from the scope of the invention as defined by the following claims.

What is claimed is:

1. A low profile swage mount for connecting a disc drive actuator arm to a load beam, said actuator arm and load beam formed with respective swage openings adapted for close fitting engagement with said swage mount and connected by mounting said swage mount to one of said actuator arm or said load beam, and forming an interference fit with said swage opening of the other of said actuator arm or said load beam by swaging a swaging element therethrough, said swage mount comprising:

a base plate of a predetermined thickness and having a planar mounting surface and formed with a base plate opening having a first diameter; and a hollow hub depending from said base plate and adapted for closely fitting within either of said swage openings and formed centrally with an aperture opening into a cylindrical open ended passage, defined by a wall of said hub having a radial width greater than said base-plate thickness, and in communication with said base plate opening to form a swaging channel, said hub passage bounded cylindrically by an inner swaging surface having a second diameter at least 85% as great as said first diameter, but not greater than said first diameter, said diameters sufficient to, after said swaging element is staked through said swaging channel, cause said hub to deform radially outwardly to engage said closely fitted swage opening and exert a frictional force of a magnitude sufficient to form a torque retaining interference fit.

2. A low profile swage mount according to claim 1 wherein:

said hub is raised outwardly a predetermined height perpendicular to said base plate to terminate in a distal edge; and said inner swaging surface having a selected axial depth at least 70% of said hub predetermined height.

3. A low profile swage mount according to claim 2 wherein:

said hub distal edge is formed with a radially tapered marginal chamfer to provide space for the displacement of material during said swaging process.

4. A low profile swage mount according to claim 1 wherein:

said axial depth is equal to or less than said base plate predetermined thickness.

5. A low profile swage mount according to claim 1 wherein:

said base plate opening merges with said hub cylindrical swaging surface through a necked down lead-in shoulder.

6. A low profile swage mount according to claim 1 wherein:

said base plate is formed from 300 series stainless steel.

7. A low profile swage mount according to claim 6 wherein:

said base plate material is of the type exposed to a heat treating process including elevated heating, controlled cooling and quenching steps to increase said frictional force.

8. A low profile disc drive swage mount for connecting a disc drive actuator arm to a load beam, said actuator arm and load beam formed with respective swage openings adapted for close fitting engagement with said swage mount and interconnected by a ball staking process that forms an interference fit, said swage mount comprising:

a base plate of a predetermined thickness and having a planar mounting surface and formed with a base plate opening having a first diameter, said base plate formed from 300 series stainless steel of the type exposed to a heat treating process including elevated heating, controlled cooling and quenching steps; and a hollow hub depending from said base plate a predetermined perpendicular height to terminate in a distal edge formed with a marginal chamfer and adapted for closely fitting within either of said swage openings, said hub having a wall having a predetermined radial width greater than said base plate thickness and formed centrally with an aperture opening into a cylindrical passage intermediately formed with a lead-in shoulder and in communication with said base plate opening to form a swaging channel, said hub passage bounded cylindrically by an inner swaging surface having a second diameter at least 85% as great as said first diameter, but not greater than said first diameter, said diameters sufficient to, after said swaging element is staked through said swaging channel, cause said hub to deform radially outwardly to engage said swage opening and exert a frictional force of a magnitude sufficient to form a torque retaining interference fit.

9. A method of connecting a disc drive actuator arm to a load beam, each having respective swage openings defined by respective radial walls, said method including the steps of:

selecting a swage mount of the type including a base plate having a planar mounting surface and formed with a base plate opening having a first diameter and a hollow hub slightly smaller than said respective swage openings and depending from said base and formed centrally with an aperture opening inwardly in communication with said base plate opening to form a swaging channel, defined by a wall of said hub having a radial width greater than said baseplate thickness, and defining an inner swaging surface of a second diameter, said second diameter being at least 85% of the size of said first diameter, but not greater than said first diameter;

mounting said swage mount fixedly to one of said actuator arm or said load beam such that said boss projects outwardly therefrom;

engaging said swage opening of said other of said actuator arm or said load beam telescopically onto said boss;

aligning said load beam longitudinally with said actuator arm;

forcing a swaging element through said swage opening and said swaging channel to deform said swage mount boss radially outwardly into an interference fit against said load beam radial wall.

\* \* \* \* \*